United States Patent [19]

Saito et al.

[11] Patent Number: 4,587,534

[45] Date of Patent: May 6, 1986

[54] LIQUID INJECTION RECORDING APPARATUS

[75] Inventors: Akio Saito, Zama; Seiichi Aoki, Machida; Tadayoshi Inamoto, Hiratsuka; Katsuyuki Yokoi, Sagamihara; Masami Ikeda, Machida, all of Japan

[73] Assignee: Canon Kabushiki Kaisha, Tokyo, Japan

[21] Appl. No.: 573,476

[22] Filed: Jan. 24, 1984

[30] Foreign Application Priority Data

| | | | |
|---|---|---|---|
| Jan. 28, 1983 | [JP] | Japan | 58-13543 |
| Jan. 28, 1983 | [JP] | Japan | 58-13544 |
| Jan. 28, 1983 | [JP] | Japan | 58-13547 |

[51] Int. Cl.⁴ .......... G01D 15/18

[52] U.S. Cl. .......... 346/140 R

[58] Field of Search .......... 346/140, 75

[56] References Cited

U.S. PATENT DOCUMENTS

| | | | |
|---|---|---|---|
| 4,209,794 | 6/1980 | Kattner | 346/140 |
| 4,296,421 | 10/1981 | Hara | 346/140 |
| 4,330,787 | 5/1982 | Sato | 346/140 |
| 4,338,611 | 7/1982 | Eida | 346/140 X |
| 4,438,191 | 3/1984 | Cloutier | 346/140 X |

*Primary Examiner*—Joseph W. Hartary

*Attorney, Agent, or Firm*—Fitzpatrick, Cella, Harper & Scinto

[57] ABSTRACT

In a liquid injection recording apparatus having discharge ports for discharging liquid and forming flying droplets, liquid flow paths communicating with the discharge ports, and energy generating means generating energy for causing the liquid to be discharged from the discharge ports, when the shortest length from the center line of the discharge ports to the central position of the energy acting surface of the energy generating means is a and the length from the center line of the discharge ports to the bottom surface of the liquid flow paths just beneath the center of the discharge ports is b, the value of a/b is 50 or less.

3 Claims, 13 Drawing Figures

LIQUID INJECTION RECORDING APPARATUS

BACKGROUND OF THE INVENTION

1. Field of the Invention .

This invention relates to a liquid injection recording apparatus, and more particularly to a liquid injection recording apparatus having means for forming so-called droplets of recording liquid.

2. Description of the Prior Art

A recording head applied to a liquid injection recording apparatus is generally provided with minute liquid discharge ports (orifices), liquid flow paths, an energy acting portion provided in a portion of the liquid flow paths, and energy generating means generating droplet forming energy for acting on the liquid in the energy acting portion.

As the energy generating means, an electromechanical converting member such as a piezo element is used in the recording methods disclosed, for example, in U.S. Pat. No. 3,683,212 and U.S. Pat. No. 3,946,398, and an example using an electro-heat converting member as the energy generating means is described in one of the recording methods disclosed in Japanese Laid-open Patent Application No. 59936/1979 (corresponding DOLS 2843064 and U.S. Ser. No. 948,236). Also, in another recording method disclosed in this Japanese Laid-open Patent Application No. 59936/1979, there is described an example in which no special means is provided in the energy acting portion but an electromagnetic wave such as laser is applied to the energy acting portion and the liquid therein is caused to absorb the electromagnetic wave and generate heat and recording is accomplished with droplets being caused to be discharged and fly by the action of the heat generation, as it were, an example in which the liquid to which the electromagnetic wave is applied provides the energy generating means.

The above-described liquid injection recording methods are such that mechanical pressure, heat energy or electromagnetic energy is caused to act on the liquid in the energy acting portion to thereby obtain a motive force for discharge of the liquid, but to enhance the quality of recorded images and enable high-speed recording to be accomplished in such recording methods, it is necessary that discharge of droplets be executed stably and continuously repetitively by the recording head and that improvement of the droplet formation frequency (the number of droplets formed per unit time = the droplet formation frequency per unit time) of the recording head and stabilization of droplet formation characteristics be achieved.

In the past, however, all of these requirements could not be said to have been sufficiently met.

On the other hand, attention has recently been paid particularly to the on-demand type liquid injection recording system.

As a specific example of the on-demand type system, there is known a system which utilizes a heat-generating resistance member, known as an electro-heat converting member in the recording method described, for example, in the aforementioned Japanese Laid-open Patent Application No. 59936/1979, to heat the liquid in the pressure generating portion and impart to the liquid the pressure generated when the liquid is suddenly gasified, thereby accomplishing discharge of droplets. This system has a great advantage that because droplets can be discharged from orifices only when necessary for printing, means for collecting unnecessary liquid and means such as a high voltage source for deflection are unnecessary. However, this system is still left to be improved in the following point. That is, the discharge pressure for causing droplets to be discharged from the orifices is relatively low and the discharge of liquid may be delicately varied by the extraneous vibration relative to the recording head or by the unnecessary heat conduction from the electro-heat converting member or by mixing of dust or bubbles and it is sometimes difficult to continue stable discharge of droplets.

The recording head of a liquid injection recording apparatus of the construction as shown in the schematic perspective view of FIG. 1 of the accompanying drawings is heretofore known. In FIG. 1, reference numeral 101 designates droplets, reference numeral 102 denotes orifices, reference numeral 103 designates an orifice plate, reference numeral 104 denotes a base plate, reference numeral 105 designates electro-heat converting members, reference numeral 106 denotes liquid flow paths, reference numeral 107 designates a liquid supply path, and reference numeral 108 denotes heat acting portions. In the liquid injection recording apparatus of FIG. 1, liquid is supplied from the liquid supply path 107 to the liquid flow paths 106 and the liquid is discharged as droplets 101 from the liquid flow paths 106 through the orifices 102 by the electro-heat converting members 105 of the heat acting portions 108 in the liquid flow paths 106.

The inventors have found that such conditions as the shape of the orifices 102 and the thickness of the orifice plate 103 greatly affect the manner in which the discharged droplets 101 fly, in other words, the accuracy of the droplet discharge and the follow-up characteristic of the droplets for an input signal.

The shape of the openings according to the prior art will now be described by taking as an example the schematic fragmentary cross-sectional views as shown in FIGS. 2 to 4 of the accompanying drawings.

In FIGS. 2 to 4, reference numerals 202, 302 and 402 designate an orifice, reference numeral 203, 303 and 403 denote an orifice plate, reference numerals 204, 304 and 404 designate a base plate, reference numerals 205, 305 and 405 denote an electroheat converting member, and reference numerals 208, 308 and 408 designate a heat acting portion.

In the example shown in FIG. 2, the cross-sectional area $S_1$ of the opening which is adjacent to the heat acting portion is equal to the minimum cross-sectional area $S_2$ of the orifice (opening). The square roots of the cross-sectional area $S_1$ and the minimum cross-sectional area $S_2$ are represented by R and r, respectively. That is, if the average orifice diameter $R=\sqrt{S_1}$ and the minimum average orifice diameter $R=\sqrt{S_2}$, then $R=r$ in the case of FIG. 2. Orifices of such a shape have heretofore often been used. However, the orifice of such a shape can accomplish relatively stable discharge of droplets while, on the other hand, it suffers from a problem that the resistance of droplet discharge is increased due to the thickness of the orifice plate 203 and the flying speed of discharged droplets is decreased. For example, if an attempt is made to effect recording by effecting high-speed scan by the use of a liquid injection recording apparatus having such an orifice shape, the droplet discharge speed is remarkably reduced as compared with the scan speed, and this may lead to cases where the variation in the scan speed cannot be absorbed. Accordingly, the accuracy with which droplets land on the recording medium is reduced to make it difficult to obtain excellent images.

FIG. 3 shows an example in which the diameter of the orifice 302 is not constant but the minimum average orifice diameter r on the atmosphere side is smaller than the average orifice diameter R on the heat acting portion 308 side ($r<R$) and the orifice plate 304 is thin. Liquid injection recording apparatus having orifices of such a shape are also popular. However, in the case of such an orifice shape, the droplet discharge speed is increased due to the orifice plate 303 being thin, but in some cases, high stability of droplet discharge may not be obtained. Further, the use of such a thin orifice plate 303 may lead to the occurrence of a problem that air enters when droplets are discharged. Accordingly, again in this case, it cannot be expected to obtain excellent image recording stably and continuously.

Further, an example as shown in FIG. 4 wherein the average orifice diameter on the heat acting portion 408 side is increased toward the atmosphere side would also occur to mind, but again in this case, the droplet discharge speed and the droplet discharge direction are unstable and also, the introduction of gas from outside is intense. Accordingly, again in a liquid injection recording apparatus having such inverted tapered orifices, excellent image recording cannot be expected because stable discharge of droplets is not effected.

Of the orifice shapes of the liquid injection recording apparatuses as described above, the orifice shapes shown in FIGS. 2 and 4 can be formed by the use of photosensitive resin, for example, Permanent Photopolymer Coating RISTON Solder Mask 730S produced by Dupont, Inc. and through the photo-forming method, and the orifice shape shown in FIG. 3 can be formed by chemically etching stainless steel SUS-316.

As described above, even the orifice shapes heretofore generally used cannot actually provide a wide range of stable discharge of droplets, and this may sometimes lead to the occurrence of a problem in respect of excellent image recording.

SUMMARY OF THE INVENTION

The present invention has been made in view of these technical tasks and an object thereof is to provide a liquid injection recording apparatus having a liquid injection recording head in which the continuous droplet formation characteristic is stabilized for a long time and the droplet formation frequency is improved.

It is another object of the present invention to provide a liquid injection recording apparatus in which the total number of droplets discharged per discharge port is greatly improved.

It is still another object of the present invention to provide a liquid injection recording apparatus suitably applicable to an on-demand type apparatus in which delicate control is required for stable discharge of liquid (ink).

It is yet still another object of the present invention to provide a liquid injection recording apparatus having a recording head which is hard to be affected by the vibration from outside, particularly, the vibration liable to occur when recording is effected with the recording head caused to scan at a high speed and in which the loss of the pressure to liquid passing through orifices is made small and mixing of bubbles with the interior of the recording head can be prevented to thereby ensure stable and highly reliable recording to be accomplished.

It is a further object of the present invention to provide a liquid injection recording apparatus having a discharge port for discharging liquid and forming flying droplets, a liquid flow path communicating with the discharge port for supplying liquid thereto from a liquid supply side, and energy generating means having an energy acting surface in the liquid flow path for causing liquid to be discharged from said discharge port, wherein the shortest distance from the center line of the discharge port to the central position of the energy acting surface is a, the distance from the intersection of the center line of the discharge port and the outer surface thereof to the intersection of the bottom surface of the liquid flow path and the center line of the discharge port is b, the central position of the energy acting surface is offset from the center line of the discharge port toward the liquid supply side, and the value of a/b is 50 or less.

It is a still further object of the present invention to provide a liquid injection recording apparatus having a discharge port for discharging liquid as flying droplets, a liquid flow path communicating with the discharge port and energy generating means having an energy acting surface in the liquid flow path for causing liquid to be discharged from the discharge port, wherein $S_N$ is the maximum area surrounded by lines formed by the intersection between (A) a space formed by (a) a plane H2 perpendicular to a plane H1 containing (i) the center line A of the discharge port and (ii) a straight line B parallel to the center line A and passing through the center of the energy generating surface, the plane H2 also containing the center line A, (b) a plane H3 perpendicular to the plane H1 and containing the straight line B, and (c) the walls of the liquid flow path, and (B) a cross-sectional plane perpendicular to the plane H2 and the plane H3, $S_H$ is the area of the energy generating surface, the plane H2 and the plane H3 are spaced from each other, and the value of $S_N/S_H$ is 250 or less.

It is a yet further object of the present invention to provide a liquid injection recording apparatus comprising an opening for discharging liquid and forming flying droplets, a liquid flow path communicating with the opening, a heat acting portion included in the liquid flow path adjacent to the opening and an electroheat converting member for generating heat to be imparted to liquid in the heat acting portion, wherein the average diameter R of the opening adjacent to the heat acting portion and the minimum average diameter r of the opening satisfy the relation $0.025 \leqq r/R < 1.0$ and the minimum average diameter r and the distance d from the outer surface of the opening to the surface of the opening adjacent to the heat acting poriton satisfies the relation $0.1 \leqq r/d \leqq 10.0$.

If, in the foregoing, the cross-sectional area of one of the openings which is adjacent to the heat acting portion is $S_1$ and the minimum cross-sectional area of the openings is $S_2$, the average diameter R of the openings (the average orifice diameter) is $R=\sqrt{S_1}$ and the minimum average diameter r of the openings (the minimum average diameter) is $r=\sqrt{S_2}$.

DESCRIPTION OF THE PREFERRED EMBODIMENTS

Figure 1:
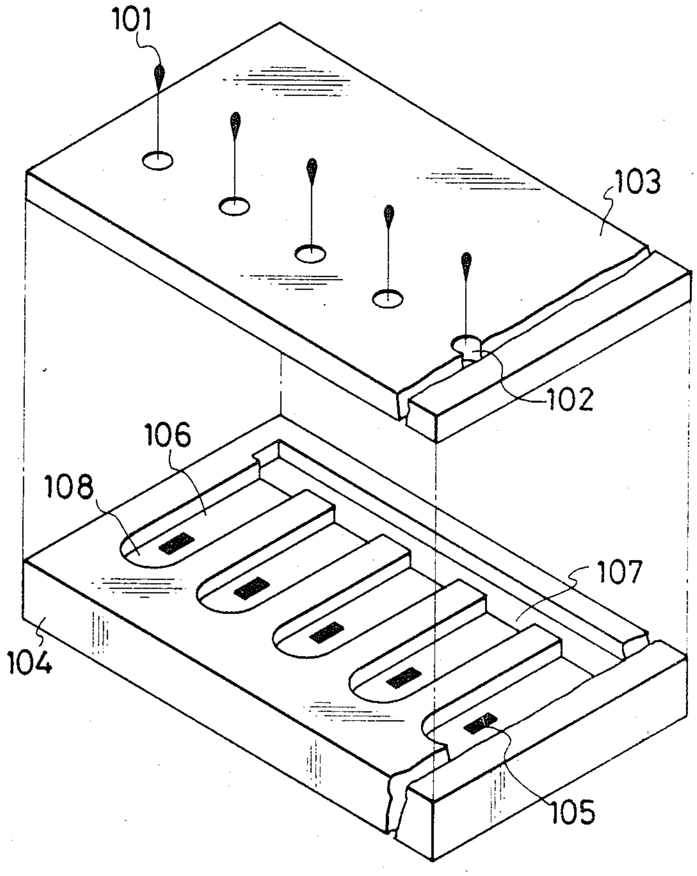
FIG. 1 PRIOR ART
FIG. 1 is a schematic perspective assembly view of a liquid injection recording apparatus.
Figure 2:
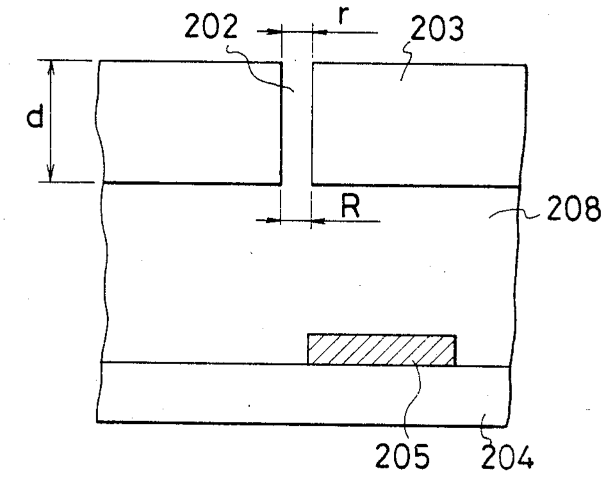
FIGS. 2 to 4 are schematic fragmentary cross-sectional views for illustrating the problems peculiar to the orifice shapes according to the prior art.
Figure 3:
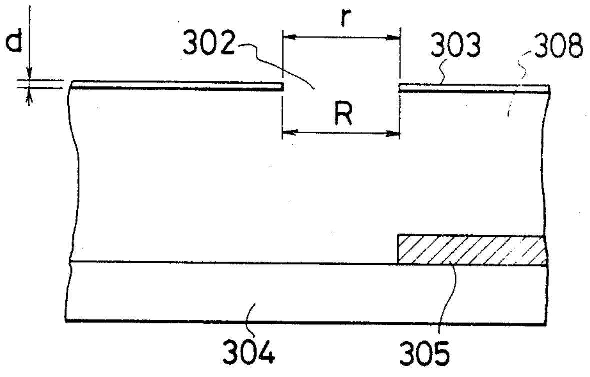
Figure 4:
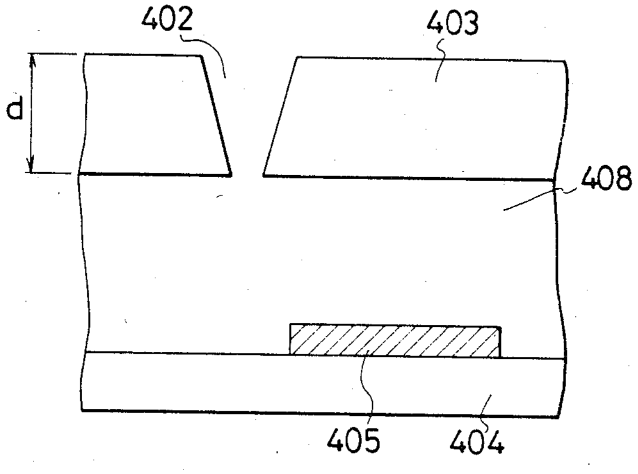

With regard to a liquid injection recording apparatus having the recording head as shown in FIG. 1, the inventors have made numerous recording heads with respect to the relation between the average orifice diameter R and the minimum average diameter r, i.e., r/R, and the relation between the minimum average diameter r and the thickness d of the orifice plate (the length from the side surface of the opening which is adjacent to the atmosphere to the side surface of the heat acting portion), i.e., r/d and have found an optimum orifice dimension relation.

That is, with regard to r/R, a result has been obtained that an orifice which satisfies preferably $0.025 \leqq r/R < 1.0$, and more preferably $0.2 \leqq r/R < 1.0$ is desirable for stable discharge of droplets. Further, with regard to r/d, a result has been obtained that a relation which satisfies preferably $0.1 \leqq r/d \leqq 10.0$, and more preferably $0.2 \leqq r/d \leqq 3.0$ is desirable.

The present invention will hereinafter be specifically described with respect to a preferred embodiment.

In the present embodiment, in a liquid injection recording apparatus using the recording head as shown in FIG. 1, the shape of an orifice 102 and the thickness of an orifice plate 103 were changed and a voltage margin at which stable discharge of droplets could be effected was measured.

First, the voltage margin relative to the value of r/R at which droplets were stably discharged was measured with the thickness d of the orifice plate and the minimum average diameter r fixed and the average orifice diameter R varied.

Figure 5:
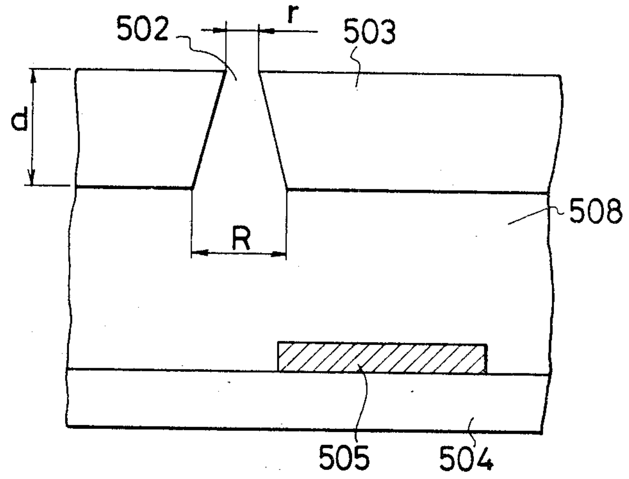
FIG. 5 is a schematic fragmentary cross-sectional view for illustrating the orifice shape of a preferred embodiment of the present invention.
Figure 6:
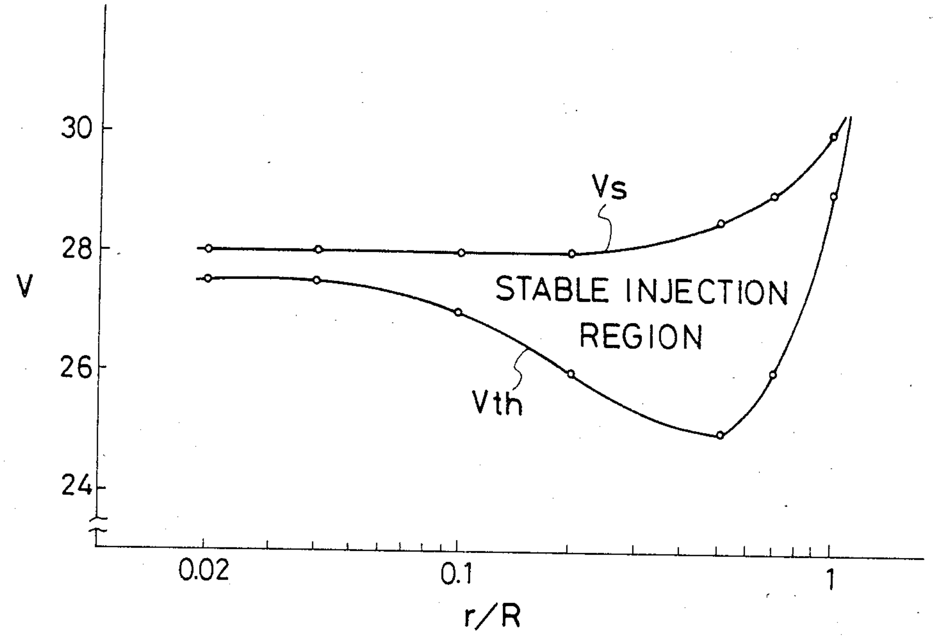
FIG. 6 is a graph showing the relation between r/R and the voltage margin.

FIG. 6 is a graph showing the relation of the variation in the voltage margin caused by the variation in r/R when both of the thickness d of the orifice plate and the minimum average diameter r are 65μ (that is, $r/d = 1.0$). In FIG. 6, curve Vth shows a voltage margin at which stable discharge of droplets is started and curve Vs shows a voltage margin at which stable discharge of droplets stops. Accordingly, the region between the curve Vth and the curve Vs is a stable droplet injection region. When $r/d = 1.0$ and $r = d = 65\mu$, it has been confirmed that, as shown, a good voltage margin width, i.e., a good range of stable injection region, is obtained within the previously mentioned range of r/R (preferably $0.025 \leqq r/R < 1.0$, and more preferably $0.2 \leqq r/R < 1.0$). If the shape of the orifice is to be expressed by the schematic cross-sectional view shown in FIG. 5, it is the tapered orifice 502 as shown in FIG. 5. In FIG. 5, reference numeral 503 designates an orifice plate, reference numeral 504 denotes a base plate, reference numeral 505 designates an electro-heat converting member, and reference numeral 508 denotes a heat acting portion.

Next, measurement was made of a voltage margin variation at which stable discharge of droplets by the variation in the thickness d of the orifice plate could be effected in the shape of the orifice as shown in FIG. 5, specifically with the minimum average diameter r fixed at 65μ and the average orifice diameter R fixed at 130μ ($r/R = 0.5$).

Figure 7:
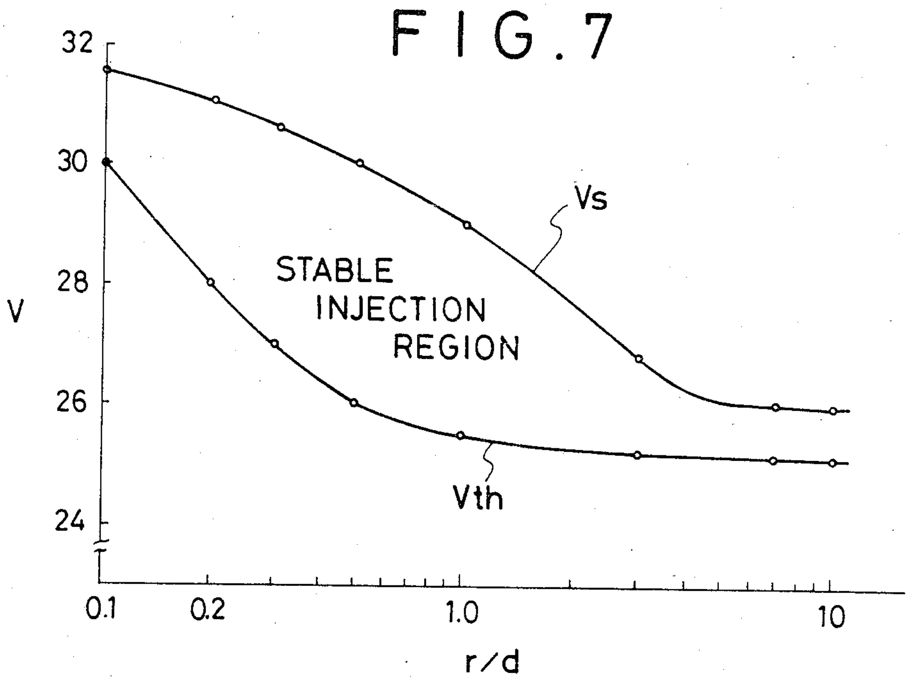
FIG. 7 is a graph showing the relation between r/d and the voltage margin.

FIG. 7 shows the relation the voltage margin variation by the variation in r/d when $r/R = 0.5$. Curves designated by Vth and Vs in FIG. 7 are similar in significance to the curves Vth and Vs shown in FIG. 6.

As shown, when $r/R = 0.5$ and $r = 65\mu$ and $R = 130\mu$, a good voltage margin width, i.e., a good droplet stable injection region, could be obtained within the previously mentioned range of r/d (at least $0.1 \leqq r/d \leqq 10.0$, and more preferably $0.2 \leqq r/d \leqq 3.0$).

As described above, by selecting the value of r/R within the above-mentioned range, there can be secured a wide voltage margin width at which discharge of droplets is stable. Also, at that time, it is very desirable that the value of r/d be within the above-mentioned range.

However, if the value of r, i.e., the value of the minimum average diameter, is too small, the orifice will become subject to obstacles such as dust (for example, the orifice will be closed by the obstacles and no droplet will be discharged therefrom) and, if the value of r is too great, discharge of droplets will become unstable. Accordingly, at least the magnitude of r should be set to a value for which the problem as mentioned above will not or hardly occur.

Figure 8:
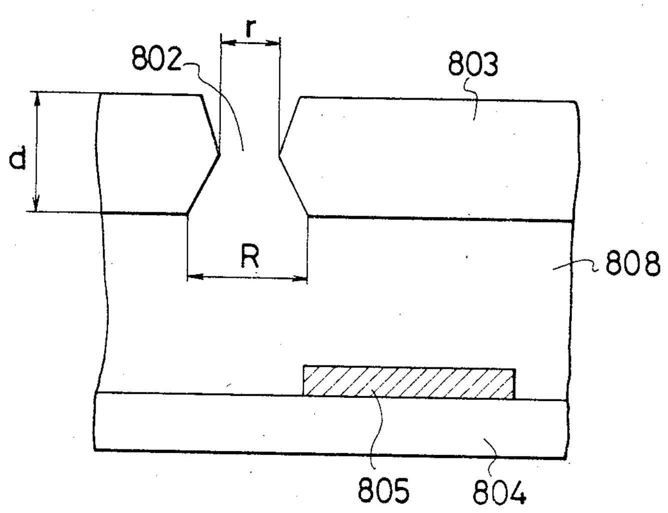
FIGS. 8 and 9 are schematic fragmentary cross-sectional views showing the orifice shapes of further embodiments of the present invention.
Figure 9:
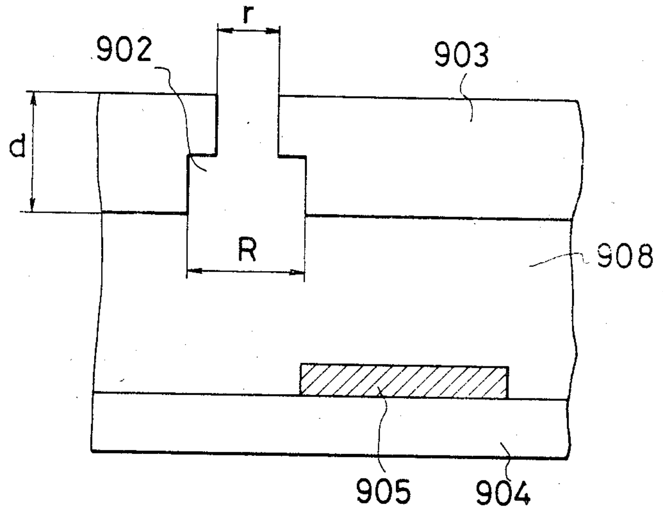

The shape of the orifice (opening) need not always be a simple tapered shape as shown in FIG. 5, but may also be a shape as shown in FIG. 8 wherein the mininum average diameter r is set in the halfway portion of the orifice. Alternatively, the orifice may be formed with the magnitude of the mininum average diameter r from the halfway portion thereof, as shown in FIG. 9. Further, in FIG. 9, the connecting portion between the average orifice diameter R and the minimum average diameter r is shown to be stepped, but of course, this connecting portion may also be smooth.

The positional relation between the electro-heat converting member and the orifice need not always be that as shown in the various Figures of the present invention, by may be any positional relation if controlled droplets can be discharged from the orifice.

This also holds true not only of the liquid injection recording apparatus having a recording head of the so-called L-type discharge shape as described herein in which liquid is discharged from the orifice while being bent from the liquid flow paths, but also of the liquid injection recording apparatus having a recording head in which liquid is discharged from the orifices provided at the terminal ends of the liquid flow paths.

Further, the present invention has been described with respect to an example in which the orifices (openings) are provided in a plate, that is, which uses an orifice plate, whereas the openings need not always be formed in a plate-like member, but if desired openings are provided, it will meet the purpose of the present invention of effecting excellent image recording continuously and stable.

A second embodiment of the present invention will now be described by reference to FIGS. 10 to 12.

Figure 10A:
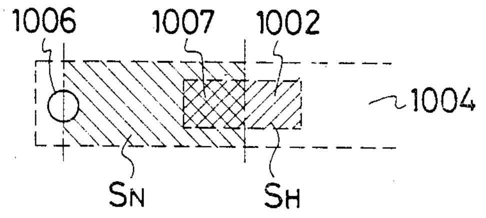
FIGS. 10A and 10B illustrate the present invention, FIG. 10A being a schematic fragmentary plan view and FIG. 10B being a schematic perspective view.
Figure 10B:
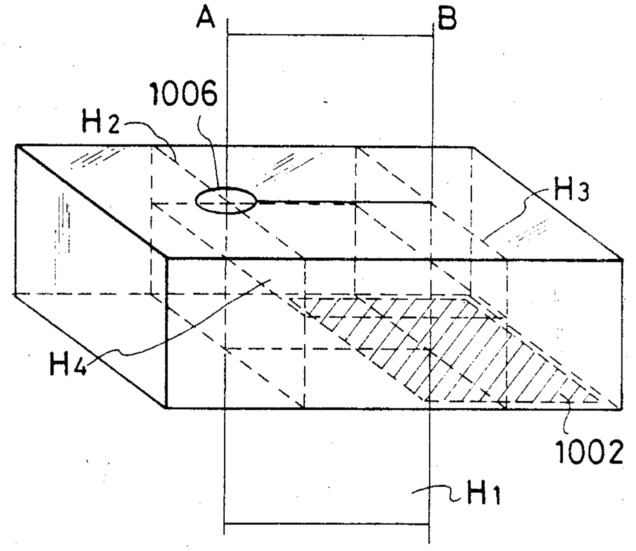

FIGS. 10A and 10B illustrate $S_N$ and $S_H$ referred to in the present invention, FIG. 10A being a schematic plan view and FIG. 10B being a schematic perspective view. In these Figures, reference numeral 1002 designates an energy generating member, reference numeral 1004 denotes a liquid flow path, reference numeral 1006 designates a discharge port, and reference numeral 1007 denotes an energy acting portion. In FIG. 10B, straight line A is a straight line passing through the center of the discharge port 1006 and perpendicular to the surface of the discharge port (the atmosphere side surface of the discharge port 1006). Straight line B is a straight line parallel to the straight line A and passing through the center of the energy generating member 1002. The plane containing these two straight lines A and B is a plane H1. Plane H2 is a plane perpendicular to the plane H1 and containing the straight line A, plane H3 is a plane perpendicular to the plane H1 and containing the straight line B.

Plane H4 is a plane perpendicular to the plane H2 and the plane H3 in the space area surrounded by the plane H2, the plane H3 and the liquid flow path walls forming the liquid flow path 1004 (accordingly, the plane H4 is perpendicular also to the plane H1).

$S_N$ referred to so in the present invention refers to one of the plane H4 which has the greatest area. Also, the center of the energy generating member is the mid-point in the lengthwise direction of the energy generating member relative to the direction of a straight line perpendicular to the straight line A and parallel to the plane H1 and the mid-point in the lengthwise direction of the energy generating member relative to the direction of a straight line perpendicular to the plane H1.

The area $S_H$ of the energy generating member referred to so in the present invention refers to the area of the portion between the electrodes connected to the member generating energy, for example, the heat-generating resistance member which is an electro-heat converting member, i.e., the gap portion between the electrodes. Also, even where a protective layer or the like exists on the energy generating member, the area $S_H$ of the energy generating member refers to the area of the gap portion between the electrodes connected to the member generating energy. Where the energy is electromagnetic energy and such energy is directly applied to liquid, the area $S_H$ is the maximum area when the liquid in the liquid flow path which absorbs that energy is cut along a plane parallel to the plane H4.

Figure 11:
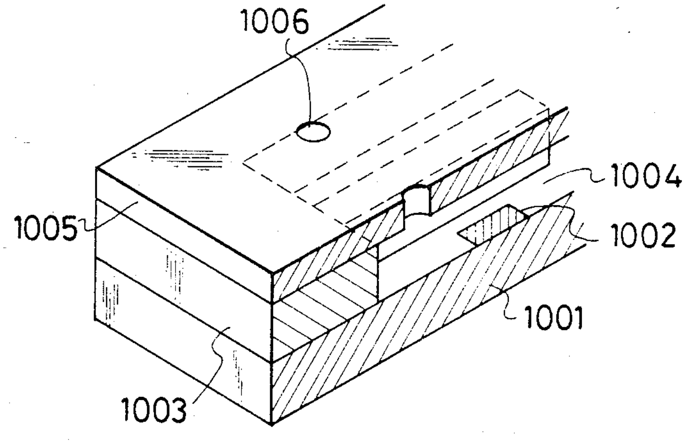
FIG. 11 is a schematic fragmentary perspective view (partly in cross-section) showing an embodiment of the present invention.

FIG. 11 is a schematic fragmentary perspective view (partly in cross-section) for illustrating a second embodiment of the present invention. In FIG. 11, reference numeral 1001 designates a base plate, reference numeral 1003 denotes a flow path wall, and reference numeral 1005 designates a discharge port plate having a discharge port 1006. In FIG. 11, reference numerals 1002, 1004 and 1007 refer to the members designated by the same reference numerals in FIGS. 10A and 10B. In the present embodiment, the energy generating member 1002 is referred to as the electro-heat converting member 1002.

In the embodiment shown in FIG. 11, heat gnergy is imparted to the liquid by the electro-heat converting member 1002 in the liquid flow path 1004, whereby droplets are discharged from the discharge port 1006. As shown in FIG. 12, the liquid flow path 1004 has a structure which is bent on the way from the energy acting portion 1007 to the discharge port 1006.

That is, in the present embodiment of the present invention, the recording head is in the form of the so-called L-type discharge (side shooter).

Description will now be made of the simple procedure of making the embodiment shown in FIG. 11. In the embodiment shown in FIG. 11, the electro-heat converting member 1002 of the structure as disclosed, for example, in DOLS 2843064 was first provided as the energy generating member on the base plate 1001, whereafter the base plate 1001 and the electro-heat converting member 1002 were laminated by the use of a photosensitive resin film (dry film photoresist; thickness of the film being 25–100μ) for forming the flow path wall 1003, and further the photosensitive resin film was exposed and developed, whereby the liquid flow path 1004 was formed. Subsequently, another photosensitive resin film providing the discharge port plate 1005 was further laminated, and was exposed and developed, whereby the discharge port 1006 was formed and the sample head of the present embodiment was made (an electrode was provided on the electro-heat converting member 1002 and a wiring leading thereto was also provided).

In the embodiment thus made, the value of $S_N$ was fixed at 125000 $\mu m^2$ and the value of $S_H$ was varied, and the voltage at which stable droplets are discharged from the discharge port (the lower limit of the voltage being V1 and the upper limit of the voltage being V2) and the total number of droplets discharged from a discharge port (expressed as the durable pulse number) were measured.

The result will be shown in Table 1 below.

TABLE 1

| Sample No. | $S_H (\mu m^2)$ | V1(V) | V2(V) | Durable pulse number |
|---|---|---|---|---|
| No. 1 | 125000 | 17 | 42 | $2 \times 10^8$ |
| No. 2 | 25000 | 17 | 42 | $1.4 \times 10^8$ |
| No. 3 | 2500 | 20 | 43 | $5.5 \times 10^7$ |
| No. 4 | 500 | 28 | 43 | $1.1 \times 10^7$ |

As shown in Table 1, when $S_N/S_H$ was 250 or less, the voltage margin width (V2-V1) was great and the durable pulse number was sufficiently great, in samples No. 1 to No. 4.

Next, the value of $S_H$ was fixed at 1000 $\mu m^2$ and the value of $S_N$ was varied, and V1, V2 and the durable pulse number were measured in a similar manner.

The result will be shown in Table 2 below.

TABLE 2

| Sample No. | $S_N (\mu m^2)$ | V1(V) | V2(V) | Durable pulse number |
|---|---|---|---|---|
| No. 5 | 1000 | 16 | 41 | $1.9 \times 10^8$ |
| No. 6 | 5000 | 16 | 41 | $1.3 \times 10^8$ |
| No. 7 | 50000 | 19 | 42 | $5.8 \times 10^7$ |
| No. 8 | 250000 | 28 | 44 | $1.2 \times 10^7$ |
| No. 9 | 500000 | 33 | 45 | $3 \times 10^5$ |

As shown in Table 2, with regard to the samples in which $S_N/S_H$ was 250 or less ($S_N$=250000 or less), the voltage margin width was great and the durable pulse number also was sufficiently great. With regard to the sample No. 9 in which $S_N/S_H$ exceeded 250 ($S_N$=500000), the voltage margin width was relatively good but the durable pulse number was a practically unusuable small value.

As regards the sample No. 9 in which $S_N/S_H$ exceeded 250, both of the voltage margin width and the durable pulse number are smaller than in the samples No. 5 to No. 8, and this is considered to be attributable to the fact that as the value of $S_N$ is greater relative to the value of $S_H$, the loss of the energy for discharging droplets becomes greater. Accordingly, in the sample No. 9 wherein $S_N/S_H$ exceeded 250, the voltage V1 at which stable discharge of droplets starts was higher than in the other samples.

To achieve the objects of the present invention more effectively, it is preferable that the value of $S_N/S_H$ be 50 or less.

The foregoing description has been made with respect to a case where one energy generating member corresponds to one discharge port, but as regards the relation of $S_N/S_H$, what has been described above applies also to a case where a plurality of energy generating members are present for one discharge port.

For example, where two or more energy generating members are present, the relation of $S_N/S_H$ may be set with respect chiefly to that energy generating member which is effecting droplet discharge. Also, where two or more energy generating members are equally concerned in droplet discharge and it is difficult to determine which of the energy generating members is main or auxiliary, the relation of $S_N/S_H$ may be set with respect to the energy generating member which is nearest the discharge port.

Further, the relation of $S_N$ and $S_H$ is applicable not only to the recording head of the L-type discharge in which as in the above-described embodiment, liquid is discharged as droplets from the discharge port 1006 while being bent from the liquid flow path 1004, but also to a recording head in which discharge ports are provided at the terminal ends of liquid flow paths. However, $S_H$ in this case is the same as previously described, while $S_N$ in the maximum area of a plane perpendicular to the discharge port surface in the space area surrounded by a plane containing a straight line passing through the center of the energy generating member and parallel to the discharge port surface, the discharge port surface and the flow path walls. Also, the center of the energy generating member in this case refers to the same portion as that previously described.

Also, the energy generating member may be one using electromagnetic energy, as previously described. Further, the shape of the energy generating member is shown in FIGS. 10 and 11, whereas such a rectangular shape is not restrictive but the shape may be modified if it permits droplets to be discharged. Again in this case, the center of the energy generating member is determined as previously described.

Even in a case where a protective layer or the like is present on the energy generating member and the electrodes of the energy generating member are not in direct contact with the liquid, the area and the center line may be determined with respect to the gap between the electrodes of the energy generating member. That is, in this case, it may be considered that the protective layer is absent.

Figure 12:
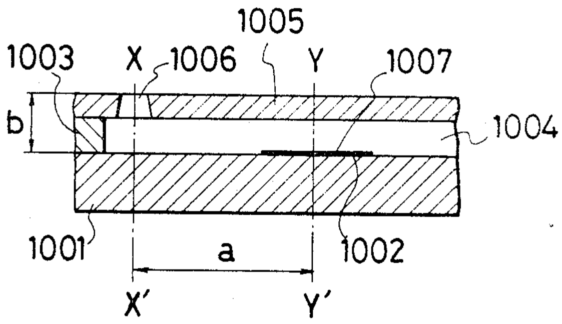
FIG. 12 is a schematic fragmentary cross-sectional view for illustrating an embodiment of the present invention.

Further, in the case of the liquid injection recording apparatus of the L-type discharge like the second embodiment, as shown in the schematic fragmentary cross-sectional view of FIG. 12, it is desirable that the length a from the center (indicated by center line YY') of the energy generating member 1002 to the center line XX' of the discharge port 1006 and the length b from the atmosphere side surface of the discharge port 1006 to the bottom surface of the liquid flow path 1004 just beneath the center of the discharge port be in the following relation.

That is, it is desirable to set the positional relation between the discharge port and the energy generating member so that the value of a/b is preferably 50 or less, and more preferably 10 or less. More specifically, in a liquid injection recording apparatus of the same construction as the FIG. 11 embodiment wherein a/b is 50, the voltage margin width was 17 V and the durable pulse number was about $5\times10^7$, and in a liquid injection recording apparatus wherein a/b is 10, the voltage margin width was 10 V or more and the durable pulse number was about $6\times10^7$.

Again in this case, to determine a, the center of the energy generating member must be determined, and this may be determined in just the same way as the center line of the energy generating member when the above-described $S_N$ was determined. Accordingly, the center of the energy generating member may be likewise determined even if it uses the application of electromagnetic energy.

Description will now be made by an example in which a liquid injection recording apparatus having a recording head of the construction as shown in FIGS. 11 and 12 was made with the value of a/b changed and the durable pulse number and the voltage margin therein were measured. The basic method of making the head is similar to what has been previously described.

In the head basically made in the above-described manner, a was fixed at 750 μm and b was varied and with respect to each sample, measurement was made of the applied voltage (lower limit voltage) V1 at which droplets start to be discharged stably and the voltage (upper limit voltage) V2 at which the stable discharge of droplets stops and further, the durable pulse number, i.e., the number of droplets stably discharged from one discharge port.

The result will be shown in Table 3 below.

TABLE 3

| Sample No. | b(μm) | V1(V) | V2(V) | Durable pulse number |
|---|---|---|---|---|
| A1 | 750 | 17 | 42 | $2 \times 10^8$ |
| A2 | 75 | 17 | 42 | $6.5 \times 10^7$ |
| A3 | 15 | 26 | 43 | $1.2 \times 10^7$ |

As shown in Table 3, in these samples wherein a/b was 50 or less, the voltage margin (V2-V1) width was great and the durable pulse number was practically sufficiently great.

Also, samples in which b was fixed at 30 μm and the value of a was varied were made separately and V1, V2 and the durable pulse number thereof were measured. The result will be shown in Table 4 below.

TABLE 4

| Sample No. | a(μm) | V1(V) | V2(V) | Durable pulse number |
|---|---|---|---|---|
| B1 | 30 | 16 | 41 | $1.9 \times 10^8$ |
| B2 | 300 | 18 | 41 | $6 \times 10^7$ |
| B3 | 1500 | 25 | 42 | $1.1 \times 10^7$ |
| B4 | 3000 | 31 | 44 | $3 \times 10^5$ |

As shown in Table 4, in the samples wherein a was up to 1500 μm, that is, a/b was 50 or less, both the voltage margin width and the durable pulse number were sufficiently great. However, in the sample wherein a/b exceeded 50, that is, a=3000 μm, the voltage margin width was narrow and the durable pulse number could not be said to be sufficiently great.

While the foregoing description has been made of the recording heads in which the number of energy generating members for one discharge port is one, what has been described above also holds true even if the number of energy generating members for one discharge port is plural.

For example, where a plurality of energy generating members are present at symmetrical positions relative to one discharge port, the value of a/b may be determined with respect chiefly to one of the members which is causing droplets to be discharged. Also, even if the energy generating members are not symmetrical, the value of a/b may be determined with respect chiefly to one of them which is acting. Further, where a plurality of energy generating members are used to cause droplets to be equally discharged (where it is difficult to distinguish the energy generating members as to which of them is main or auxiliary), the value of a/b may be applied to one of the energy generating members which is nearer to the discharge port.

The condition of a/b can be applied even to a recording head in which the energy generating member having a so-called element-like shape is not present in the energy acting portion for causing energy to act on liquid but only a portion for applying magnetic energy or the like is present. Again in this case, if the center of the area to which electromagnetic energy has been applied is regarded as the center of the energy generating member as in the case of the latter, the values of a and b will be likewise determined. Also, again in a case where electromagnetic energy is used, if the number of the energy-applied areas is not one for one discharge port, the value of a/b may be set in the same manner as in the case of the energy generating member with the main energy-applied area as the reference or with the energy-applied area nearer to the discharge port as the reference when it is difficult to distinguish which of the energy-applied areas is main or auxiliary.

As described above, the present invention has great merits such as the improved reliability of droplet discharge brought about by the increased voltage margin width, the each of designing and the compactness of the energy generating portion of the energy acting portion or the driving circuit of the energy imparting means.

Further, according to the present invention, there can be provided a liquid injection recording apparatus which can effect stable discharge of droplets for a long period of time.

Also, where the head of the recording apparatus is constructed like the embodiment shown in FIG. 11, it is possible to provide a high density of the order of 20 lines/mm when it is desired to form a number of discharge ports in the same head and make the head into a multi-head, and the improved reliability of droplet discharge enables more excellent image recording to be accomplished.

What we claim is:

1. A liquid injection recording apparatus having a discharge port for discharging liquid and forming flying droplets, a liquid flow path communicating with said discharge port for supplying liquid thereto from a liquid supply side, and energy generating means having an energy acting surface in said liquid flow path for causing liquid to be discharged from said discharge port, wherein:

the shortest distance from the center line of said discharge port to the central position of said energy acting surface is a, the distance from the intersection of the center line of said discharge port and the outer surface thereof to the intersection of the bottom surface of said liquid flow path and the center line of said discharge port is b, the center position of said energy acting surface is offset from the center line of said discharge port toward the liquid supply side, and the value of a/b is 50 or less.

2. A liquid injection recording apparatus having a discharge port for discharging liquid as flying droplets, a liquid flow path communicating with said discharge port and energy generating means having an energy acting surface in said liquid flow path for causing liquid to be discharged from said discharge port, wherein:

$S_N$ is the maximum area surrounded by lines formed by the intersection between (A) a space formed by (a) a plane H2 perpendicular to a plane H1 containing (i) the center line A of said discharge port and (ii) a straight line B parallel to the center line A and passing through the center of said energy generating surface, said plane H2 also containing the center line A, (b) a plane H3 perpendicular to said plane H1 and containing the straight line B, and (c) the walls of said liquid flow path, and (B) a cross-sectional plane perpendicular to said plane H2 and said plane H3, $S_H$ is the area of said energy generating surface, said plane H2 and said plane H3 are spaced from each other, and the value of $S_N/S_H$ is 250 or less.

3. A liquid injection recording apparatus comprising an opening for discharging liquid and forming flying droplets, a liquid flow path communicating with said opening, a heat acting portion included in said liquid flow path adjacent to said opening and an electroheat converting member for generating heat to be imparted to liquid in said heat acting portion, wherein the average diameter R of said opening adjacent to said heat acting portion and the minimum average diameter r of said opening satisfy the relation $0.025 \leqq r/R < 1.0$ and said mininmum average diameter r and the distance d from the outer surface of said opening to the surface of said opening adjacent to said heat acting portion satisfies the relation of $0.1 \leqq r/d \leqq 10.0$.

* * * * *